United States Patent
Otomo et al.

(10) Patent No.: US 10,253,124 B2
(45) Date of Patent: Apr. 9, 2019

(54) COPOLYMER HAVING ADJUSTABLE GLASS TRANSITION TEMPERATURE AND HAVING USEFULNESS AS ORGANIC ELECTRO-OPTIC POLYMER, AND ORGANIC ELECTRO-OPTIC ELEMENT USING THE SAME

(71) Applicant: NATIONAL INSTITUTE OF INFORMATION AND COMMUNICATIONS TECHNOLOGY, Tokyo (JP)

(72) Inventors: Akira Otomo, Tokyo (JP); Isao Aoki, Tokyo (JP); Toshiki Yamada, Tokyo (JP); Hideki Miki, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 15/126,080

(22) PCT Filed: Mar. 17, 2015

(86) PCT No.: PCT/JP2015/057783
§ 371 (c)(1),
(2) Date: Sep. 14, 2016

(87) PCT Pub. No.: WO2015/141650
PCT Pub. Date: Sep. 24, 2015

(65) Prior Publication Data
US 2017/0088654 A1    Mar. 30, 2017

(30) Foreign Application Priority Data

Mar. 18, 2014 (JP) ................. 2014-055653

(51) Int. Cl.
| | | |
|---|---|---|
| *C08F 220/36* | (2006.01) | |
| *G02F 1/061* | (2006.01) | |
| *C08F 220/18* | (2006.01) | |
| *C08G 18/72* | (2006.01) | |
| *C08G 18/28* | (2006.01) | |
| *G02F 1/361* | (2006.01) | |

(52) U.S. Cl.
CPC .......... *C08F 220/36* (2013.01); *C08F 220/18* (2013.01); *C08G 18/284* (2013.01); *C08G 18/288* (2013.01); *C08G 18/2815* (2013.01); *C08G 18/728* (2013.01); *G02F 1/061* (2013.01); *G02F 1/3617* (2013.01); *C08F 2810/40* (2013.01)

(58) Field of Classification Search
None
See application file for complete search history.

(56) References Cited

U.S. PATENT DOCUMENTS

| | | | | |
|---|---|---|---|---|
| 5,239,013 | A * | 8/1993 | Francis ................. | C08F 8/30 525/279 |
| 2005/0040377 | A1* | 2/2005 | Drotleff ............... | G02B 6/1221 252/586 |

FOREIGN PATENT DOCUMENTS

| | | |
|---|---|---|
| EP | 0 394 027 | 10/1990 |
| JP | 2013-25261 | 2/2013 |
| JP | 2014-44272 | 3/2014 |
| WO | 2013/154078 | 10/2013 |

OTHER PUBLICATIONS

Wood, Journal of Polymer Science, vol. 28, p. 319-330 (1958) (Year: 1958).*
International Search Report dated Apr. 28, 2015 in International Application No. PCT/JP2015/057783.
Martin Eckl, et al., "Nonlinear Optical Active Polymethacrylates with High Glass Transition Temperatures", Molecular Crystals and Liquid Crystals Science and Technology. Section A. Molecular Crystals and Liquid Crystals, vol. 283, 1996, pp. 143-149.
Extended European Search Report dated Sep. 20, 2017 in corresponding European Patent Application No. 15764563.1.
Xianqing Piao et al., "Nonlinear Optical Side-Chain Polymers Post-Functionalized with High-β Chromophores Exhibiting Large Electro-Optic Property", Journal of Polymer Science: Part A: Polymer Chemistry, 2011, vol. 49, No. 1, pp. 47-54.

* cited by examiner

*Primary Examiner* — Robert C Boyle
(74) *Attorney, Agent, or Firm* — Wenderoth, Lind & Ponack, L.L.P.

(57) ABSTRACT

An object of the present invention is to provide an organic EO polymer having a desired Tg. The present invention provides a copolymer comprising (i) a cycloalkane methacrylate and 2-isocyanatoethyl methacrylate as monomers at an adjusted blending ratio and (ii) an electro-optic molecule (EO molecule) bound to the copolymer, thereby exhibiting a desired glass transition temperature (Tg).

7 Claims, No Drawings

COPOLYMER HAVING ADJUSTABLE GLASS TRANSITION TEMPERATURE AND HAVING USEFULNESS AS ORGANIC ELECTRO-OPTIC POLYMER, AND ORGANIC ELECTRO-OPTIC ELEMENT USING THE SAME

TECHNICAL FIELD

The present invention relates to a copolymer of which the glass transition temperature (hereinafter also referred to as Tg) is adjustable and which is useful as an organic electro-optic polymer (hereinafter also referred to as an organic EO polymer), an organic electro-optic element containing the same, and the like.

BACKGROUND ART

Electro-optic materials (hereinafter also referred to as EO materials) are applicable to optical control elements, such as an optical modulator, an optical switch, an optical memory, an optoelectronic circuit, wavelength tuning, an electric field sensor, THz wave generation and detection, and holography. EO materials have been produced using inorganic materials, such as lithium niobate. However, inorganic materials have limited high speed performance and lack sufficient capacity to achieve the next-generation ultra-high-speed optical communication.

Organic EO polymers exhibit a larger electro-optic effect (hereinafter also referred to as an EO effect) compared with inorganic materials and achieve high-speed operation, and therefore, the polymers are expected to serve as electro-optic materials for creating the next-generation optical communication. However, application of organic EO polymers to produce devices with optical control elements has a number of problems to be solved, and such devices have not yet been used in practice. One of the problems is to achieve a long-term stability of an EO effect.

Devices with optical control elements usually have an optical waveguide. The basic structure of an optical waveguide using an organic EO polymer is usually a three-layer structure in which a core layer comprising an organic EO polymer is sandwiched by upper and lower cladding layers not comprising an organic EO polymer. In order to exhibit an EO effect, the organic EO polymer have to be subjected to alignment (poling) treatment by applying an electric field at a temperature close to the glass transition temperature (Tg) of the polymer. However, when the Tg is too low, the alignment may be relaxed in a short period of time, leading to a decrease in the EO effect.

For formation of an optical waveguide, the core layer must have a higher refractive index than those of the cladding layers. The core layer also must have an equal or higher electrical resistivity than those of the cladding layers, otherwise the electric field is not effectively applied to the core layer, resulting in poling failure.

The present inventors found a method for adjusting the refractive index and the electrical resistivity of an organic EO polymer by adjusting the concentrations of components having second-order nonlinear optical properties (i.e. electro-optic molecules) in a crosslinkable polymer composition that contains two or more components having second-order nonlinear optical properties and has a photopolymerizable residue in the polymer side chain (Patent Literature 1).

However, when the organic EO polymer produced by the method described in Patent Literature 1 is used to produce core and cladding layers, the cladding layers have a much lower Tg than the Tg of the core layer. A much higher poling temperature than the Tg of the organic EO polymer would result in softening and deformation of the EO polymer, and therefore, the poling temperature was required to be adjusted to the Tgs of the cladding layers so that the cladding layers did not deform. However, the adjusted poling temperature was too low for poling of the core layer.

The Tg of an organic EO polymer is determined by the kind of polymer that forms the backbone and the addition ratio of an EO molecule in the polymer. However, polymethyl methacrylate, which is used as a backbone polymer of a typical organic EO polymer, has a Tg as low as 100 to 110° C., which is insufficient for a device with an optical control element, the Tg of an organic EO polymer can be increased by increasing the amount of an EO molecule contained in the polymer. However, an EO molecule has to be added in an optimum amount in core and cladding layers for the formation of an optical waveguide, and therefore the Tg cannot be adjusted by adjusting the amount of an EO molecule contained in the polymer.

Accordingly, a method for adjusting the Tg of an organic EO polymer to a desired level has been required.

Non-patent Literature 1 discloses a method for increasing the Tg value of an organic EO polymer by providing a copolymer of adamantyl methacrylate with a polymethacrylate. However, in the method described in Non-patent Literature 1, a monomer having an EO molecule bound thereto is used for polymerization to give an organic EO polymer, and as a result, the reaction rates varies between a monomer having an EO molecule and a monomer not having an EO molecule. Therefore, a randomly polymerized organic EO polymer has been difficult to produce.

CITATION LIST

Patent Literature

Patent Literature 1: Japanese Patent Application No. 2012-185880

Non-Patent Literature

Non-patent Literature 1: M. Eckl, P. Strohriegl, M. Eich, M. Sprave, J. Vydra, "Nonlinear Optical Active Polymethacrylates with High Glass Transition Temperatures." Molecular Crystals and Liquid Crystals Science and Technology. Section A. Molecular Crystals and Liquid Crystals, vol. 283, 143 (1996),

SUMMARY OF INVENTION

Technical Problem

The present invention was made in order to solve the above problems, and thus an object of the present invention is to provide an organic EO polymer having a desired Tg. Another object of the present invention is to provide a randomly polymerized organic EO polymer.

Solution to Problem

In order to solve the above problems, the present inventors carried out extensive investigations, and consequently found that a copolymer comprising a cycloalkane methacrylate and 2-isocyanatoethyl methacrylate as monomers and having a desired glass transition temperature (Tg) is obtained by preparing the copolymer at an adjusted blending ratio of the monomers and binding an electro-optic molecule (EO molecule) to the copolymer. The inventors further advanced investigations and completed the present invention.

That is, the present invention relates to the following copolymer and the like.

[1] A copolymer comprising (i) a cycloalkane methacrylate and 2-isocyanatoethyl methacrylate as monomers at an adjusted blending ratio and (ii) an electro-optic molecule (EO molecule) bound to the copolymer, thereby exhibiting a desired glass transition temperature (Tg).

[2] The copolymer according to the above [1], wherein the cycloalkane is an optionally bridged monocyclic or fused ring.

[3] An organic electro-optic element comprising the copolymer according to the above [1] or [2].

[4] The organic electro-optic element according to the above [3], which is an optical modulator or an optical switch.

[5] A method for producing a copolymer having a desired glass transition temperature (Tg), the method comprising (i) preparing a copolymer comprising a cycloalkane methacrylate and 2-isocyanatoethyl methacrylate as monomers at an adjusted blending ratio, and (ii) binding an electro-optic molecule (EO molecule) to the copolymer.

Advantageous Effects of Invention

The present invention provides a copolymer comprising a cycloalkane methacrylate and 2-isocyanaethyl methacrylate at an adjusted blending ratio and an electro-optic molecule (EO molecule) bound to the copolymer, thereby exhibiting a desired Tg. The copolymer of the present invention can be used as an organic EO polymer to serve as core and cladding layers having a Tg optimized for use as an EO material.

Since the present invention provides such an organic EO polymer that serves as core and cladding layers having an optimized Tg, the present invention enables the production of an organic EO polymer device with a high EO effect, thereby allowing the production of a small-sized optical modulator with a high EO efficiency and enabling optical communication at high speed and low power consumption.

DESCRIPTION OF EMBODIMENTS

The present invention will be described in detail below.

The copolymer of the present invention comprises (i) a cycloalkane methacrylate and 2-isocyanatoethyl methacrylate as monomers at an adjusted blending ratio and (ii) an electro-optic molecule (EO molecule) bound to the copolymer, thereby exhibiting a desired glass transition temperature (Tg).

The cycloalkane in the cycloalkane methacrylate is not particularly limited in the present invention, but is preferably a monocyclic or fused ring. The monocyclic or fused ring may be bridged. Examples of the fused ring include a bicyclo ring, a tricyclo ring, and the like.

The polymerization method of the copolymer is not particularly limited in the present invention provided that a cycloalkane methacrylate and 2-isocyanatoethyl methacrylate are used as raw material monomers for the polymerization. Conventionally known methods, such as solution polymerization and bulk polymerization, can be used, and solution polymerization is preferably used. Such polymerization techniques have already been well established and the present invention may be carried out according to the techniques.

The solvent used in solution polymerization is not particularly limited, and examples thereof include aromatic hydrocarbon solvents, such as benzene, toluene, xylene, and ethylbenzene; ester solvents, such as ethyl acetate and butyl acetate; ketone solvents, such as methyl ethyl ketone and methyl isobutyl ketone; ether solvents, such as tetrahydrofuran; halogenated hydrocarbon solvents, such as chloroform; and the like. These can be used alone or in combination of two or more kinds thereof. Preferred are aromatic hydrocarbon solvents, ester solvents, ether solvents, and the like, and more preferred are benzene, toluene, tetrahydrofuran, and the like.

The amount of the solvent used is not particularly limited, but is appropriately selected so that the monomer concentration in the polymerization system will usually be in the range of about 10 to 70% by weight, and will preferably be about 20 to 50% by weight.

The polymerization temperature can be appropriately selected depending on the reaction scale and the like. The inner temperature of the reaction mixture is usually required to be in the range of 0 to 200° C., and is preferably about 30 to 100° C., and more preferably about 50 to 80° C.

The polymerization time varies depending on the reaction scale, the reaction temperature, and the like. The polymerization time is usually required to be appropriately selected from the range of several minutes to 20 hours, and is preferably about 0.5 to 10 hours, and more preferably about 1 to 6 hours. The several minutes means about 1 to 10 minutes.

The blending ratio of the cycloalkane methacrylate to 2-isocyanatoethyl methacrylate used to produce the copolymer of the present invention is not particularly limited. The molar ratio of the cycloalkane methacrylate to 2-isocyanatoethyl methacrylate is, for example, about 1:10 to 15:1, preferably about 1:5 to 10:1, and more preferably about 1:2 to 6:1.

In the polymerization to give the copolymer according to the present invention, a radical polymerization initiator may be used at the time of the polymerization. The radical polymerization initiator is not particularly limited, and a publicly known compound can be used.

Examples of the radical polymerization initiator include organic peroxides, azo compounds, and the like. Examples of the organic peroxides include cumene hydroperoxide, diisopropylbenzene hydroperoxide, di-t-butyl peroxide, lauroyl peroxide, benzoyl peroxide, t-butyl peroxy isopropylcarbonate, t-amyl peroxy isononanoate, t-amyl peroxy-2-ethylhexanoate, and the like. Examples of the azo compounds include 2,2'-azobisisobutyronitrile, 1,1'-azobis(cyclohexanecarbonitrile), 2,2'-azobis (2,4-dimethylvaleronitrile), dimethyl 2,2'-azobisisobutyrate, 2,2'-azobis[2-(2-imidazolin-2-yl)propane], and the like. The radical polymerization initiator is preferably benzoyl peroxide, 2,2'-azobisisobutyronitrile, 1,1'-azobis(cyclohexanecarbonitrile), or the like.

In a preferred embodiment of the polymerization method of the copolymer according to the present invention, a cycloalkane methacrylate is heated with 2-isocyanatoethyl methacrylate in the presence of a solvent and a polymerization initiator to initiate addition polymerization to give Copolymer (A). The obtained Copolymer (A) is then subjected to binding with an EO molecule to give a copolymer of the present invention represented by the following Formula (1).

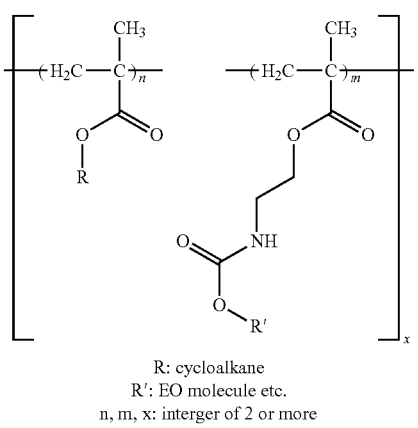

(1)

R: cycloalkane
R′: EO molecule etc.
n, m, x: interger of 2 or more

At the time of polymerization to give Copolymer (A), by adjusting the blending ratio of the cycloalkane methacrylate to 2-isocyanatoethyl methacrylate, the resulting copolymer of the present invention having an EO molecule bound to Copolymer (A) will have a desired Tg value.

Specifically, at the time of the polymerization to give Copolymer (A), an increase in the proportion of the cycloalkane methacrylate relative to 2-isocyanatoethyl methacrylate will result in an increase in the Tg of Copolymer (A), and a decrease in the proportion of the cycloalkane methacrylate relative to 2-isocyanatoethyl methacrylate will result in a decrease in the Tg of Copolymer (A).

For example, as described in the Example described later, an about 0.9 to 5.4 mol % increase in the proportion of dicyclopentanyl methacrylate relative to 2-isocyanatoethyl methacrylate (1 mol) will result in an about 1 to 50° C. increase in the Tg of Copolymer (A).

The binding pattern of the EO molecule to Copolymer (A) is not particularly limited, but preferably, the EO molecule is bound to the side chain of a 2-isocyanatoethyl methacrylate unit contained in Copolymer (A).

The method for binding the EO molecule to Copolymer (A) is not particularly limited, but preferably, for example, Copolymer (A) is reacted with the EO molecule under heating in the presence of a catalyst and a solvent to allow the binding of Copolymer (A) with the EO molecule. The solvent, the heating temperature, and the heating time are not particularly limited, but are preferably similar to the solvent, the polymerization temperature, and the polymerization time in the polymerization as described above to give the copolymer of the present invention. The catalyst is not particularly limited and examples thereof include dibutyltin dilaurate, pyridine, triethylamine and the like. Preferably, the catalyst is dibutyltin dilaurate or the like.

The EO molecule used in the present invention is not particularly limited, and may be selected from the second-order nonlinear optical components described in, for example, U.S. Pat. 6,067,186, JP 2004-501159 T, WO 2011/024774 A1, "Hisenkeikogaku no tameno Yukizairyo" (edited by The Chemical Society of Japan, KIKAN KAGAKU SOSETSU No. 15 (1992)), "Organic Nonlinear Optical Materials" (Ch. Bosshard, et. al., Gordon and Breach Publishers (1995)), "Recent Advance on photonic Organic Materials for Information and Telecommunication Applications" (supervised by Toshikuni Kaino, CMC Publishing Co., Ltd. (2007)), "Molecular Nonlinear Optics" (ed. J. Zyss, Academic Press (1994)), and the like.

Examples of the EO molecule include molecules represented by the following Formulae [A-1] to [A-7].

[A-1]

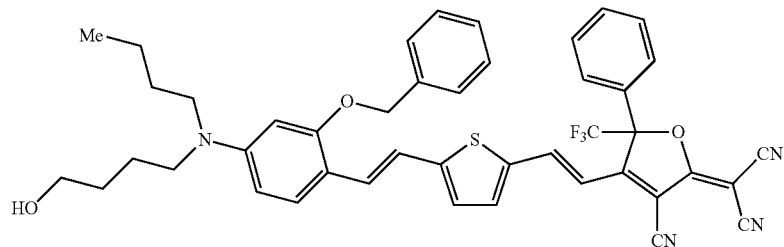

[A-2]

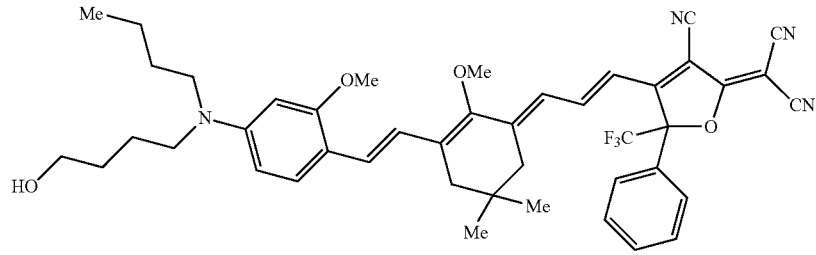

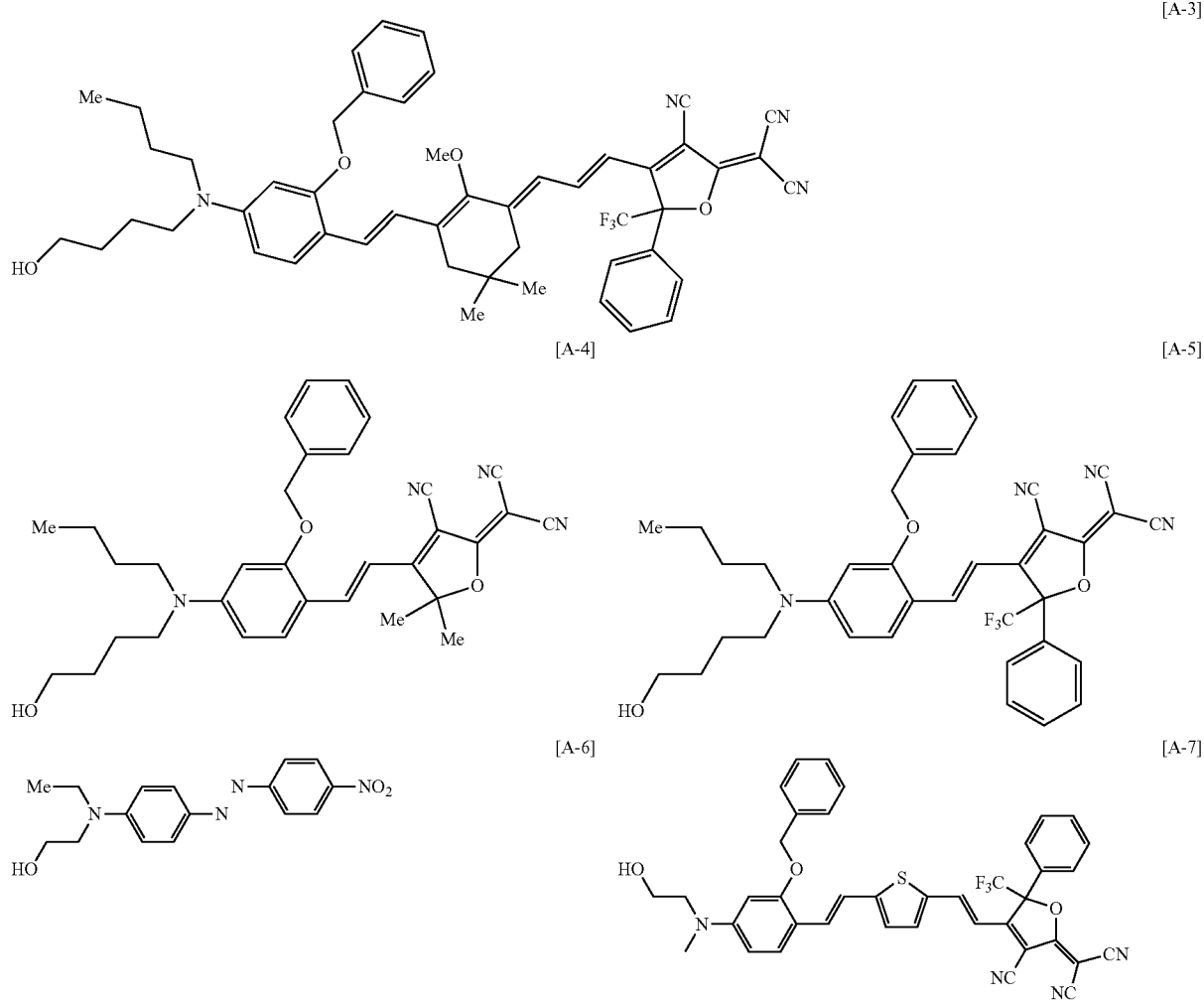

The amount of the EO molecule contained in the copolymer of the present invention is not particularly limited, but is usually about 1 to 70% by weight, preferably about 5 to 60% by weight, and more preferably about 10 to 50% by weight, relative to the total amount the polymer obtained by binding the EO molecule to Copolymer (A) (the copolymer of the present invention).

The copolymer of the present invention may comprise a compound, other than the essential compounds (Copolymer (A) and the EO molecule). The compound other than the essential compounds may be added and/or bound during or after the polymerization of Copolymer (A) and may be later added and/or bound to the copolymer of the present invention.

The compound other than the essential compounds is not particularly limited, and examples thereof include additives and the like, including light stabilizers, such as benzotriazoles, benzophenones, and salicylic acid esters; photocuring initiators, such as acetophenones (including benzil dimethylketal, α-hydroxyacetophenone, α-aminoacetophenone, and the like), acyl phosphine oxides, O-acyloximes, and titanocenes; triplet sensitizers, such as Michler's ketone and N-acetyl-4-nitro-1-naphthylamine; crosslinking aids, such as polythiols (including tris[(3-mercaptopropionyloxy)-ethyl]-isocyanurate, trimethylolpropane tris(3-mercaptopropionate), pentaerythritol tetrakis (3-mercaptopropionate), dipentaerythritol hexa (3-mercaptopropionate) pentaerythritol tetrakis (3-mercaptobutyrate), 1,4-bis(3-mercaptobutyryloxy)butane, 1,3,5-tris(3-mercaptobutyloxyethyl)-1,3,5-triazaine-2,4,6-(1H, 3H, 5H)-trione, trimethylolpropane tris(3-mercaptobutyrate), trimethylolethane tris(3-mercaptobutyrate), and the like), pentaerythritol tetraacrylate, pentaerythritol tetraacrylate, trimethylolpropane triacrylate, pentaerythritol allyl ether, and triallyl isocyanurate; etc. These can be used alone or in combination of two or more kinds thereof. In cases where these additives and the like are added, the amount thereof contained in the copolymer of the present invention is usually about 0.5 to 30% by weight, and preferably about 1 to 20% by weight, relative to the total amount of the copolymer of the present invention.

The number average molecular weight (Mn) of the copolymer of the present invention is not particularly limited, but is usually about 5,000 to 100,000 and preferably about 10,000 to 50,000. The number average molecular weight (Mn) is a value measured by the method in Examples described later.

The Tg of the copolymer of the present invention is not particularly limited, but is usually about 105 to 230° C. and preferably about 110 to 200° C. The Tg is a value measured by the method in Examples described later.

The copolymer of the present invention obtained as described above can be used as an organic electro-optic element. That is, the present invention also includes an organic electro-optic element containing the copolymer. The organic electro-optic element may also comprise a component other than the copolymer of the present invention. The organic electro-optic element is preferably an optical modulator or an optical switch.

The organic electro-optic element of the present invention can be used, through a conventionally known method, in for example, an optical modulator, an optical switch, a multi-core switch, an optical interconnect, optical wiring in a chip, THz wave generation, a THz sensor, a highly sensitive electroencephalograph with high S/N ratio, a brain-machine interface (BMI), holography, and the like. For example, in cases where the organic electro-optic polymer of the present invention is used to produce an optical waveguide, the optical waveguide can be produced as appropriate using the method described in Japanese Patent Application No. 2012-185880 (a method for producing a three-layer optical waveguide by lamination of organic EO polymer layers).

EXAMPLES

The present invention will be specifically described with reference to Examples and Comparative Examples below, but the present invention is not limited to them.

First, a method for evaluating the copolymers produced in Examples will be described.

Measurement of Glass Transition Temperature (Tg)

The Tg of the polymer obtained in each of Examples and Comparative Examples was measured using a differential scanning calorimeter (Rigaku Thermo plus DSC 8230, manufactured by Rigaku Corporation) under the following conditions: measurement sample: 10 mg, reference sample: empty aluminum pan, nitrogen atmosphere, and temperature rise rate: 10° C./min.

Measurement of Number Average Molecular Weight (Mn) and Weight Average Molecular Weight (Mw)

The molecular weights of the polymer obtained in each Example were determined by GPC using Alliance e2695 (manufactured by Kihon Waters K. K.) (column: Shodex GPC KF-804L (8 mm in diameter×300 mm in length), developing solvent: THF, and column temperature: 40° C.).

Example 1

Copolymer (A-1)

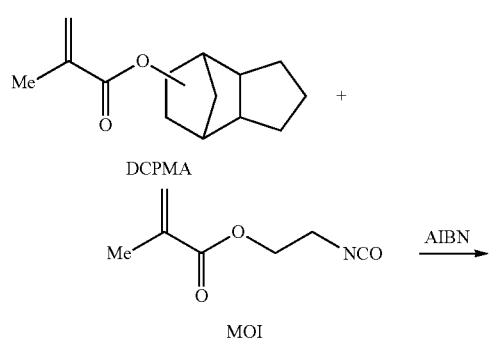

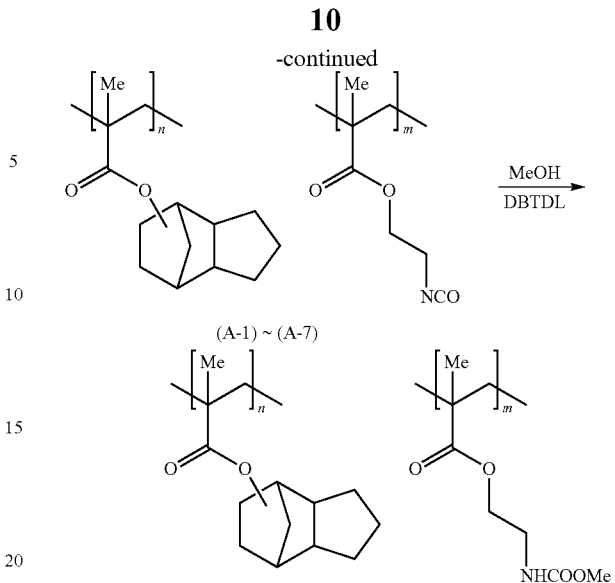

In 3.75 mL of toluene were dissolved 1.89 g (8.56 mmol) of dicyclopentanyl methacrylate (DCPMA), 1.5 g (9.67 mmol) of 2-isocyanatoethyl methacrylate (MOI), and 80 mg (0.49 mmol) of azoisobutyronitrile (AIBN). The container was filled with argon, and then the mixture was stirred under shaded conditions in an oil bath at 70° C. for 2 hours. The mixture was cooled and then poured into 130 mL of diisopropyl ether (IPE), and the whole was stirred. The precipitate was collected by filtration, washed with IPE and dried by heating to 70° C. under reduced pressure to give 3.07 g of Copolymer (A-1).

Copolymer (A-1) in an amount of 1.0 g was dissolved in 35 mL of tetrahydrofuran. To the solution, 3.0 mL of methanol (MeOH) and 30 μL of dibutyltin dilaurate (DBTDL) were added and the mixture was stirred in an oil bath at 60° C. for 2 hours. The reaction mixture was cooled and then poured into 300 mL of IPE, and the whole was stirred. The precipitated powder was collected by filtration, washed with IPE, and then dried by heating to 70° C. under reduced pressure to give 0.9 g of a methylcarbamate of Copolymer (A-1) as a colorless powder. The obtained methylcarbamate had a Tg of 101.1° C., an Mn of 32,600, and an Mw of 97,500.

Copolymers (A-2) to (A-7) were produced in a similar manner to the above except that the ratio of DCPMA to MOI was as described in Table 1. The copolymers were converted into methylcarbamates and the Tg and molecular weights of each methylcarbamate were measured. The results are shown in Table 1.

TABLE 1

| Copolymer | DCPMA/MOI ratio (mol) | Tg (° C.) | Mn | Mw |
|---|---|---|---|---|
| A-1 | 0.885/1 | 101.1 | 32,600 | 97,500 |
| A-2 | 1.49/1 | 115.7 | 31,200 | 82,600 |
| A-3 | 1.87/1 | 120.6 | 29,600 | 71,300 |
| A-4 | 2.17/1 | 125.4 | 36,600 | 89,100 |
| A-5 | 2.45/1 | 129.2 | 34,200 | 80,000 |
| A-6 | 2.83/1 | 130.3 | 45,700 | 96,200 |
| A-7 | 5.39/1 | 149.6 | 73,900 | 153,000 |

The results in Table 1 revealed, that an about 0.9 to 5.4 mol % increase in the proportion of DCPMA relative to MOI (1 mol) resulted in an about 1 to 50° C. increase in the Tg of Copolymers (A). It is clear from these results that a desired Tg value of a copolymer comprising DCPMA and MOI as monomers is achieved by adjusting the blending ratio of DCPMA to MOI.

Example 2

Copolymer (B-1)

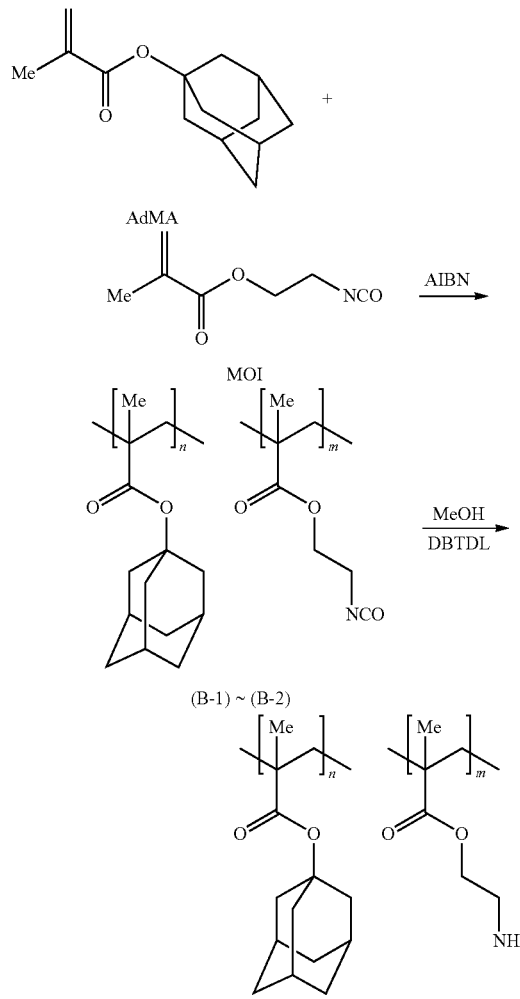

In 15 mL of toluene were dissolved 7.54 g (34.19 mmol) of adamantyl methacrylate (AdMA), 6.0 g (38.67 mmol) of 2-isocyanatoethyl methacrylate (MOI), and 360 mg (2.19 mmol) of AIBN. The container was filled with argon, and then the mixture was stirred under shaded conditions in an oil bath at 70° C. for 2 hours. The mixture was cooled and then poured into 530 mL of IPE, and the whole was stirred. The precipitate was collected by filtration, washed with IPE and dried by heating to 70° C. under reduced pressure to give 13.33 g of Copolymer (B-1).

Copolymer (B-1) in an amount of 0.7 g was dissolved in 35 mL of tetrahydrofuran. To the solution, 1.0 mL of methanol and 15 μL of dibutyltin dilaurate (DBTDL) were added and the whole was stirred in an oil bath at 60° C. for 2 hours. The reaction mixture was cooled and then poured into 300 mL of IPE, and the whole was stirred. The precipitated powder was collected by filtration, washed with IPE, and then dried by heating to 70° C. under reduced pressure to give 0.6 g of a methylcarbamate of Copolymer (B-1) as a colorless powder. The obtained methylcarbamate had a Tg of 115.7° C., an Mn of 27,500, and an Mw of 86,500.

Example 3

Copolymer (B-2)

In 20 mL of toluene were dissolved 11.25 g (51.07 mmol) of adamantyl methacrylate (AdMA), 2.8 g (18.05 mmol) of 2-isocyanatoethyl methacrylate (MOI), and 340 mg (2.07 mmol) of AIBN. The container was filled with argon, and then the mixture was stirred under shaded conditions in an oil bath at 70° C. for 2 hours. The mixture was cooled and then poured into 700 mL of IPE, and the whole was stirred. The precipitate was collected by filtration, washed with IPE and dried by heating to 70° C. under reduced pressure to give 14.31 g of Copolymer (B-2).

Copolymer (B-2) in an amount of 1.0 g was dissolved in 50 mL of tetrahydrofuran. To the solution, 3.0 mL of methanol and 30 μL of dibutyltin dilaurate (DBTDL) were added and the whole was stirred in an oil bath at 60° C. for 2 hours. The reaction mixture was cooled and then poured into 430 mL of IPE, and the whole was stirred. The precipitated powder was collected by filtration, washed with IPE, and then dried by heating to 70° C. under reduced pressure to give 0.70 g of a methylcarbamate of Copolymer (B-2) as a colorless powder. The obtained methylcarbamate had a Tg of 166.7° C., an Mn of 33,000, and an Mw of 70,500.

It is clear from the results of Examples 2 and 3 that, also in cases where AdMA was used as a cycloalkane methacrylate, adjusting the blending ratio of AdMA to MOI in the production of a copolymer comprising AdMA and MOI as monomers resulted in the copolymer having a desired Tg value.

Example 4

Copolymer (C-1)

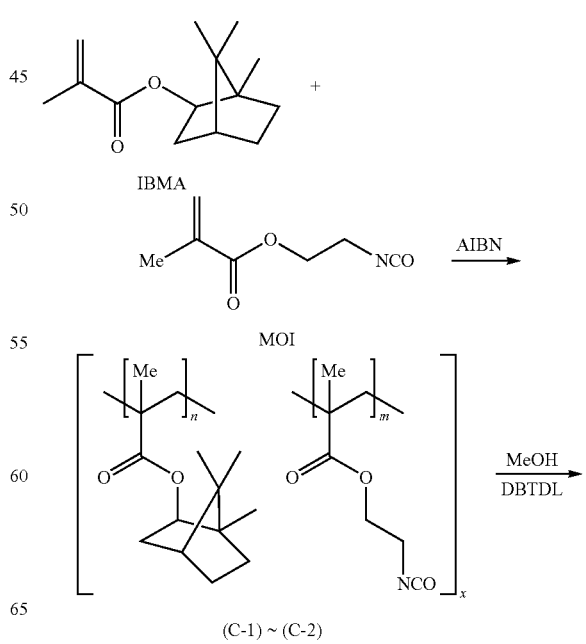

-continued

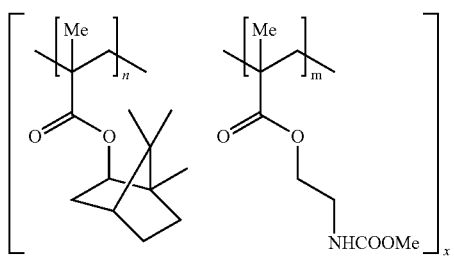

In 17.5 mL of toluene were dissolved 8.8 g (39.58 mmol) of isobornyl methacrylate (IBMA), 6.95 g (44.79 mmol) of 2-isocyanatoethyl methacrylate (MOI), and 419 mg (2.53 mmol) of AIBN. The container was filled with argon, and then the mixture was stirred under shaded conditions in an oil bath at 70° C. for 2 hours. The mixture was cooled and then poured into 600 mL of diisopropyl ether, and the whole was stirred. The precipitate was collected by filtration, washed with diisopropyl ether and dried by heating to 70° C. under reduced pressure for 17 hours to give 14.86 g of Copolymer (C-1).

Copolymer (C-1) in an amount of 1.3 g was dissolved in 35 mL of tetrahydrofuran. To the solution, 3.0 mL of methanol and 40 µL of dibutyltin dilaurate (DBTDL) were added and the whole was stirred in an oil bath at 60° C. for 2 hours. The reaction mixture was cooled and then poured into 600 mL of diisopropyl ether (IPE), and the whole was stirred. The precipitated powder was collected by filtration, washed with IPE, and then dried by heating to 70° C. under reduced pressure to give 1.18 g of a methylcarbamate of Copolymer (C-1) as a colorless powder. The obtained methylcarbamate had a Tg of 106.3° C., an Mn of 30,300, and an Mw of 63,900.

Example 5

Copolymer (C-2)

In 14 mL of toluene were dissolved 9.89 g (44.48 mmol) of isobornyl methacrylate (IBMA), 2.44 g (15.73 mmol) of 2-isocyanatoethyl methacrylate (MOI), and 297 mg (1.803 mmol) of AIBN. The container was filled with argon, and then the mixture was stirred in an oil bath at 70° C. for 2 hours. The mixture was cooled and then poured into 480 mL of diisopropyl ether, and the whole was stirred. The precipitate was collected by filtration, washed with diisopropyl ether and dried by heating to 70° C. under reduced pressure for 17 hours to give 8.68 g of Copolymer (C-2).

Copolymer (C-2) in an amount of 1.29 g (1.64 mmol) was dissolved in 35 mL of THF. To the solution, 3.0 mL of methanol and 40 µL of DBTDL were added and the whole was stirred in an oil bath at 60° C. for 2 hours. The reaction mixture was cooled and then poured into 600 mL of diisopropyl ether (IPE), and the whole was stirred. The viscous precipitate was collected by decantation, 100 mL of IPE was added thereto, and the mixture was stirred. The precipitated polymer was collected using a glass filter and washed with diisopropyl ether. The precipitated powder was collected by filtration, washed with IPE, and then dried by heating to 70° C. under reduced pressure for 17 hours to give 0.546 g of a methylcarbamate of Copolymer (C-2) as a colorless powder. The obtained methylcarbamate had a Tg of 144.7° C., an Mn of 66,300, and an Mw of 98,200.

It is clear from the results of Examples 4 and 5 that, also in cases where IBMA was used as a cycloalkane methacrylate, adjusting the blending ratio of IBMA to MOI in the production of a copolymer comprising IBMA and MOI as monomers resulted in the copolymer having a desired Tg value.

Example 6

Copolymer (D-1)

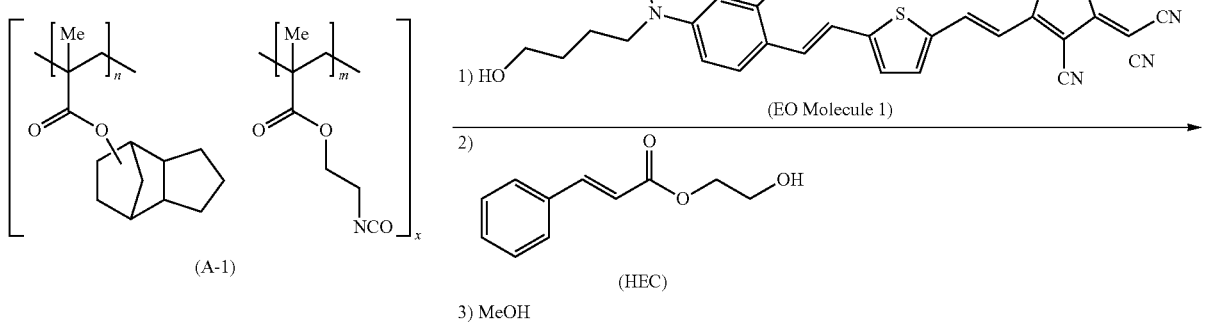

-continued

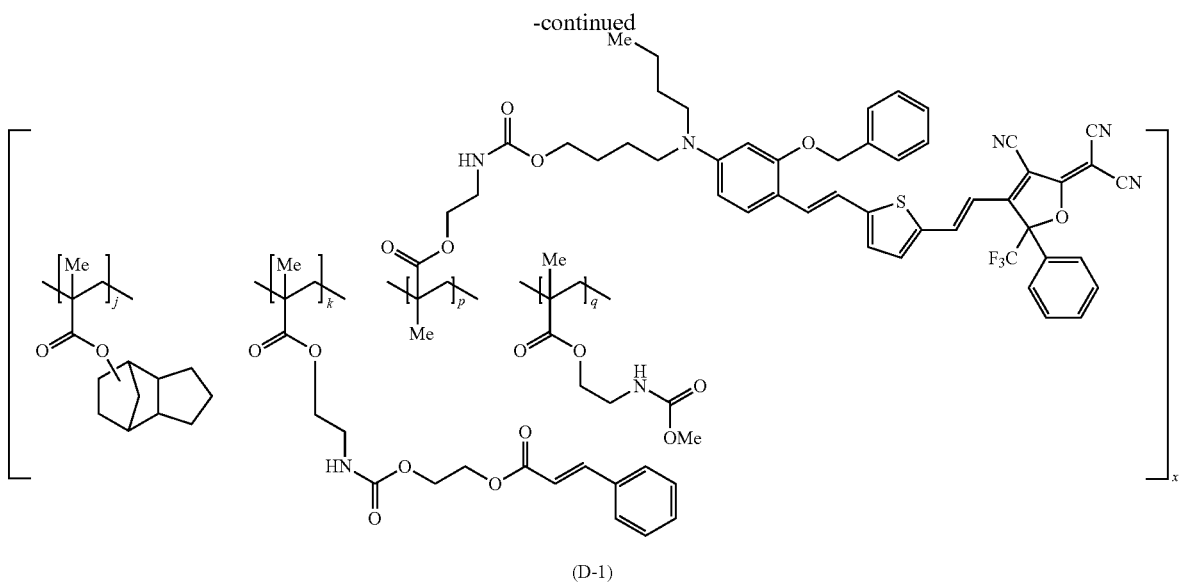

(D-1)

In 55 mL of tetrahydrofuran, 1.09 g of Copolymer (A-1) was dissolved. To the solution, 0.5 g (0.657 mmol) of SKNEO-237 (EO Molecule 1) and 40 μL of DBTDL were added and the mixture was stirred in an oil bath at 60° C. for 2 hours. To this, 0.4 g (2.08 mmol) of 2-hydroxyethyl cinnamate (HEC) in 1 mL of tetrahydrofuran and 20 μL of DBTDL were added and the whole was stirred for 1.5 hours. To this, 3 mL of methanol was added and the whole was stirred for 0.5 hours. The reaction mixture was cooled and then poured into 440 mL of IPE, and the whole was stirred. The precipitated powder was collected by filtration, washed with IPE, and then dried by heating to 70° C. under reduced pressure to give 1.76 g of Copolymer (D-1) as a black powder. The obtained Copolymer (D-1) had a Tg of 102.5° C.

Example 7

Copolymer (D-2)

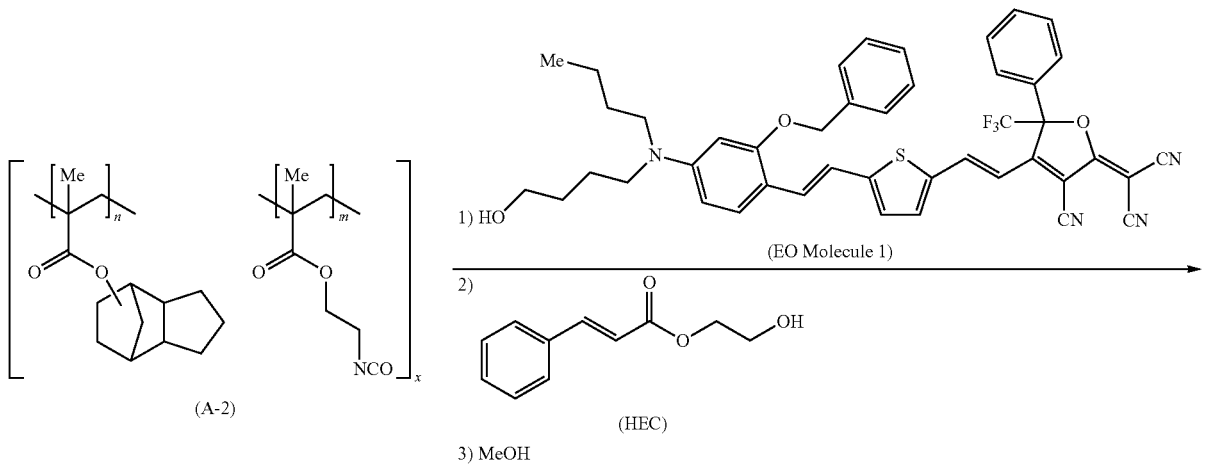

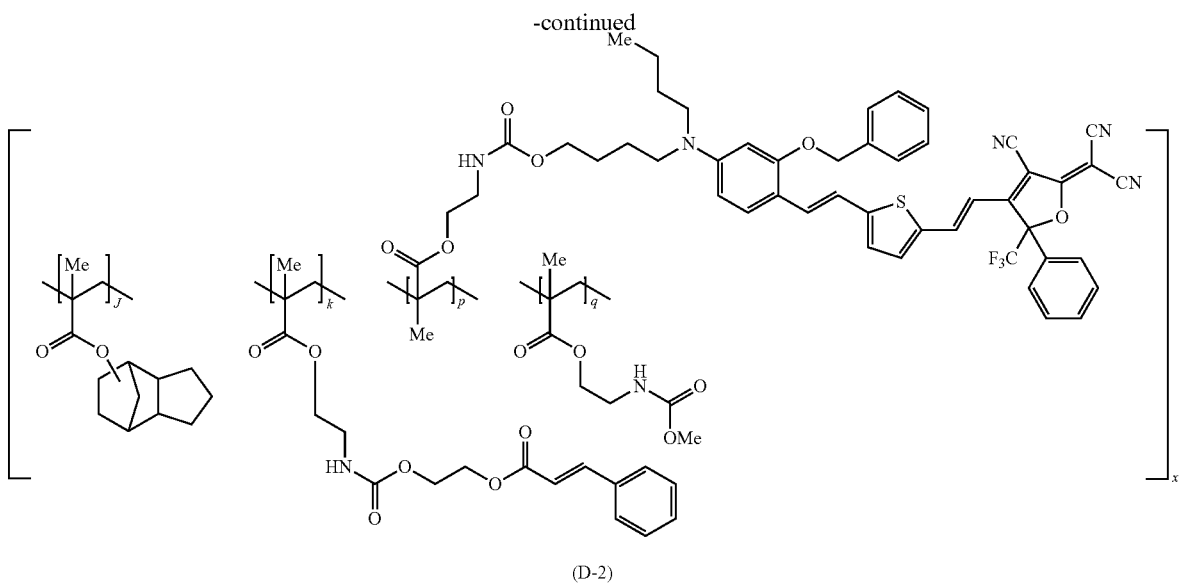

(D-2)

In 55 mL of tetrahydrofuran, 1.27 g of Copolymer (A-2) was dissolved. To the solution, 0.5 g (0.657 mmol) of EO Molecule 1 and 40 μL of DBTDL were added and the mixture was stirred in an oil bath at 60° C. for 2 hours. To this, 0.2 g (1.041 mmol) of HEC in 1 mL of tetrahydrofuran and 20 μL of DBTDL were added and the whole was stirred under heating to 70° C. for 1.5 hours. To this, 3 mL of methanol was added and the whole was stirred for 0.5 hours. The reaction mixture was cooled and then poured into 660 mL of diisopropyl ether (IPE), and the whole was stirred. The precipitated powder was collected by filtration, washed with IPE, and then dried by heating to 70° C. under reduced pressure to give 1.79 g of Copolymer (D-2) as a black powder. The obtained Copolymer (D-2) had a Tg of 116.1° C.

Example 8

Copolymer (D-3)

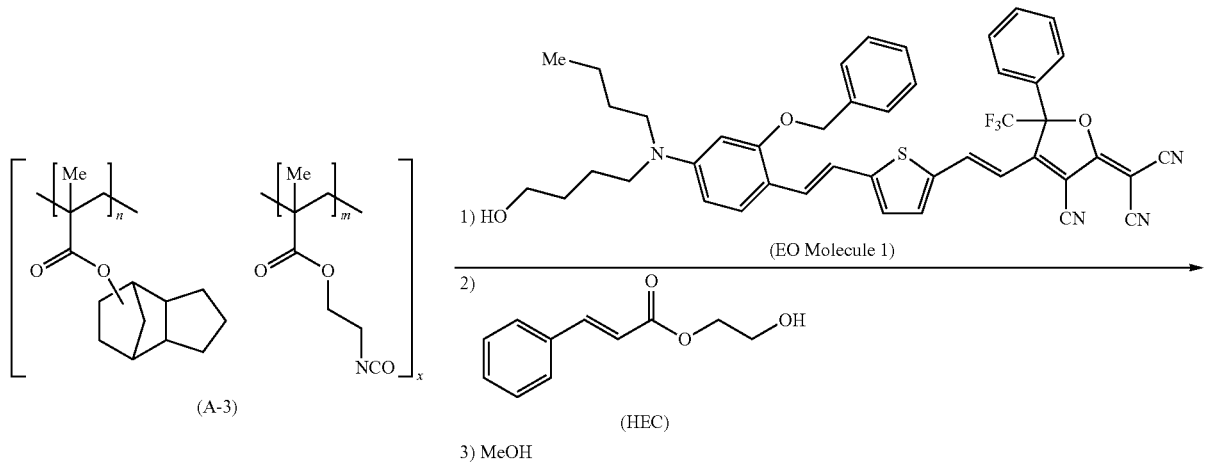

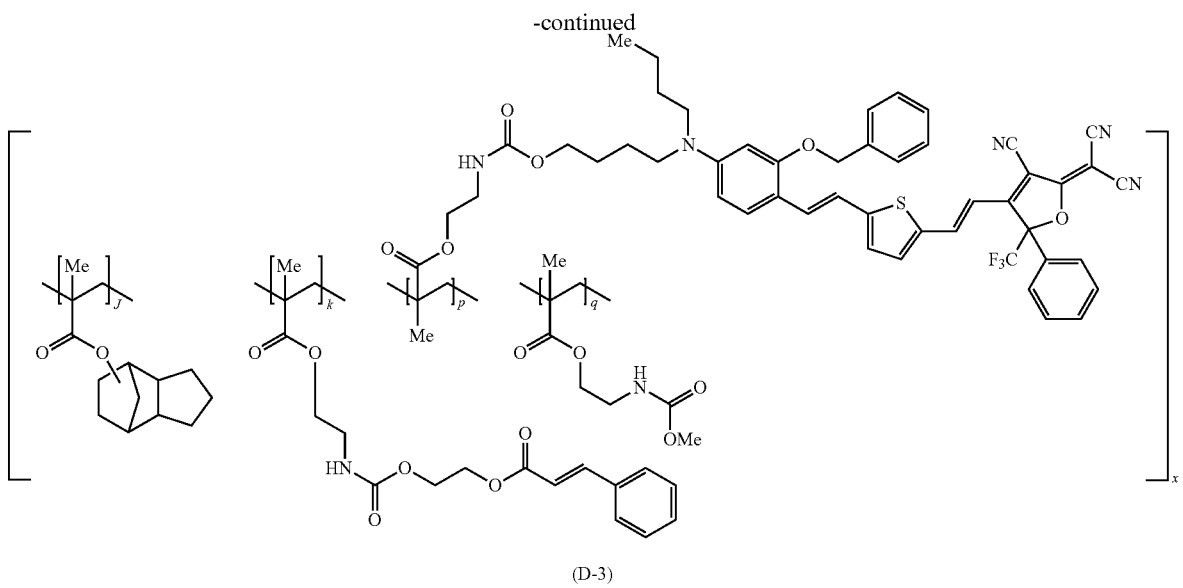

(D-3)

In 55 mL of tetrahydrofuran, 1.28 g of Copolymer (A-3) was dissolved. To the solution, 0.5 g (0.657 mmol) of EO Molecule 1 and 40 μL of DBTDL were added and the mixture was stirred in an oil bath at 60° C. for 2 hours. To this, 0.2 g (1.041 mmol) of HEC in 1 mL of tetrahydrofuran and 20 μL of DBTDL were added and the whole was stirred for 1 hour and further stirred under heating to 70° C. for another 1 hour. To this, 3 mL of methanol was added and the whole was stirred for 0.5 hours. The reaction mixture was cooled and then poured into 660 mL of diisopropyl ether (IPE), and the whole was stirred. The precipitated powder was collected by filtration, washed with IPE, and then dried by heating to 70° C. under reduced pressure to give 1.79 g of Copolymer (D-3) as a black powder. The obtained Copolymer (D-3) had a Tg of 120.0° C.

Example 9

Copolymer (D-4)

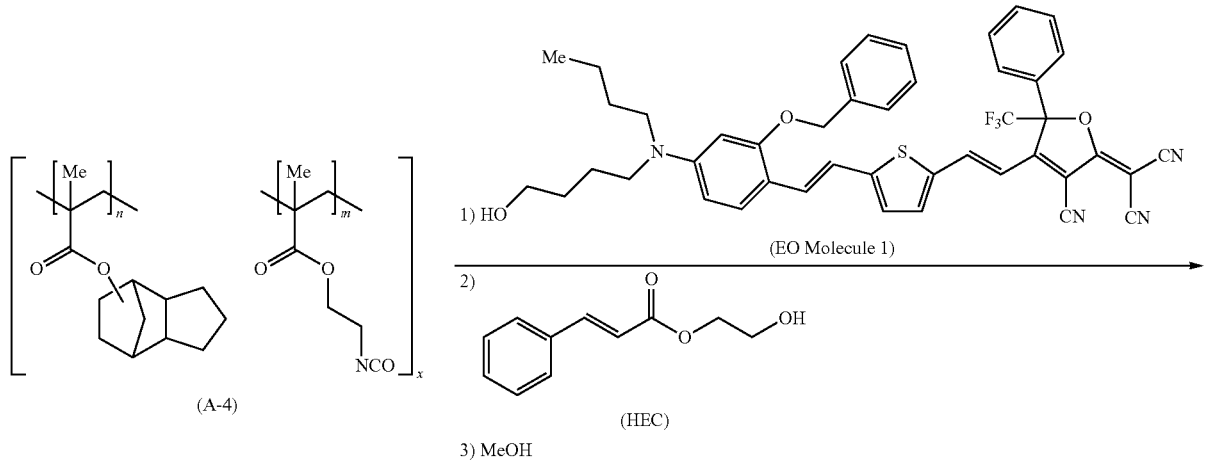

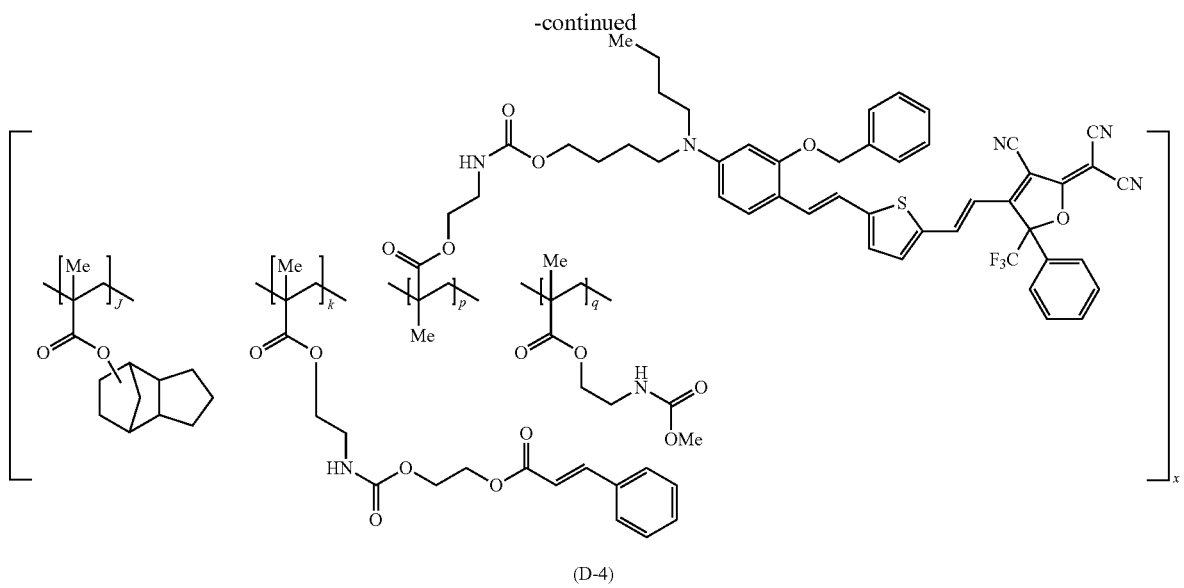

(D-4)

In 55 mL of THF were dissolved 1.29 g of Copolymer (A-4) and 0.5 g (0.657 mmol) of EO Molecule 1. To the solution, 40 μL of DBTDL was added and the mixture was stirred in an oil bath at 60° C. for 2 hours. To this, 0.2 g (1.04 mmol) of HEC in 1 mL of THF and 20 μL of DBTDL were added and the whole was stirred for 1.5 hours. To this, 3 mL of methanol was added and the whole was stirred for 45 minutes. The reaction mixture was cooled and then poured into 660 mL of diisopropyl ether (IPE), and the whole was stirred. The precipitated powder was collected by filtration, washed with IPE, and then dried by heating to 70° C. under reduced pressure for 16 hours to give 1.72 g of Copolymer (D-4) as a black powder. The obtained Copolymer (D-4) had a Tg of 125.9° C.

Example 10

Copolymer (D-5)

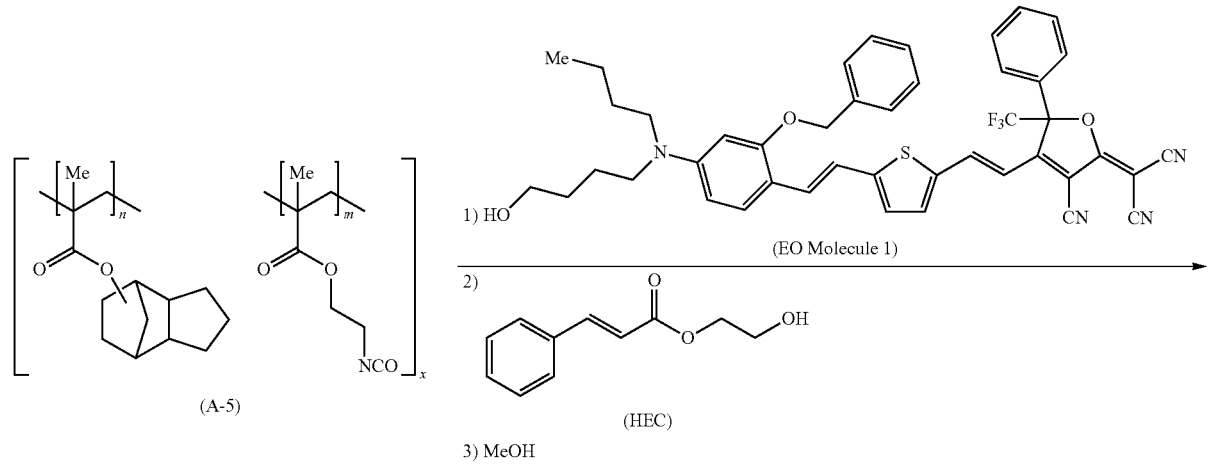

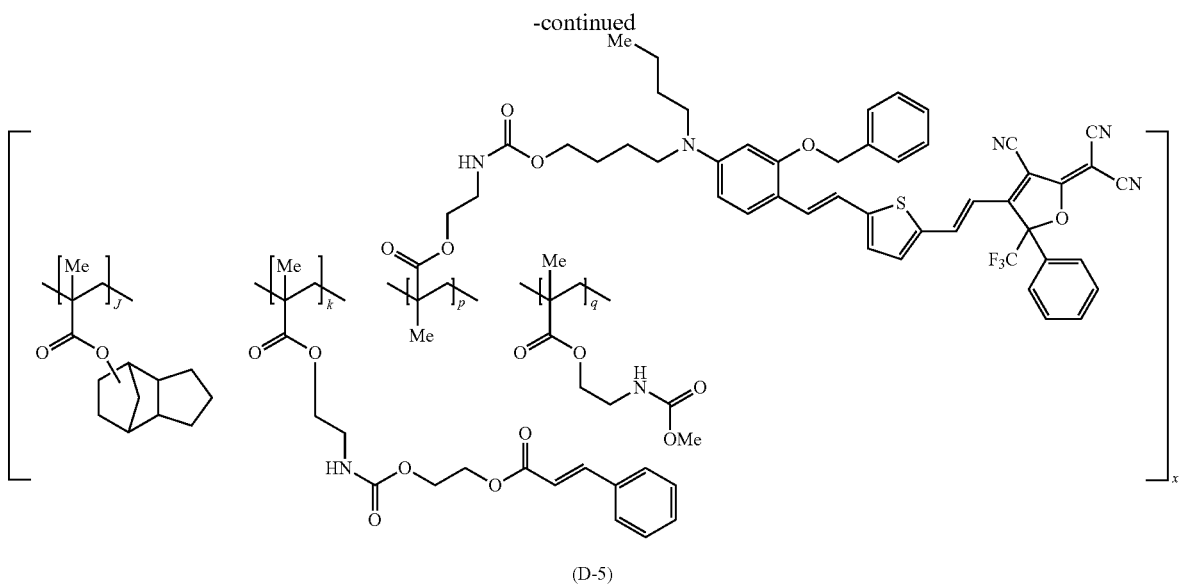

(D-5)

In 55 mL of tetrahydrofuran, 1.29 g of Copolymer (A-5) was dissolved. To the solution, 0.5 g (0.657 mmol) of EO Molecule 1 and 40 μL of DBTDL were added and the mixture was stirred in an oil bath at 60° C. for 2 hours. To this, 0.2 g (1.04 mmol) of HEC in 1 mL of tetrahydrofuran and 20 μL of DBTDL were added and the whole was stirred for 1.5 hours. To this, 3 mL of methanol was added and the whole was stirred for 0.5 hours. The reaction mixture was cooled and then poured into 660 mL of diisopropyl ether (IPE), and the whole was stirred. The precipitated powder was collected by filtration, washed with IPE, and then dried by heating to 70° C. under reduced pressure to give 1.73 g of Copolymer (D-5) as a black powder. The obtained Copolymer (D-5) had a Tg of 131.3° C.

Example 11

Copolymer (D-6)

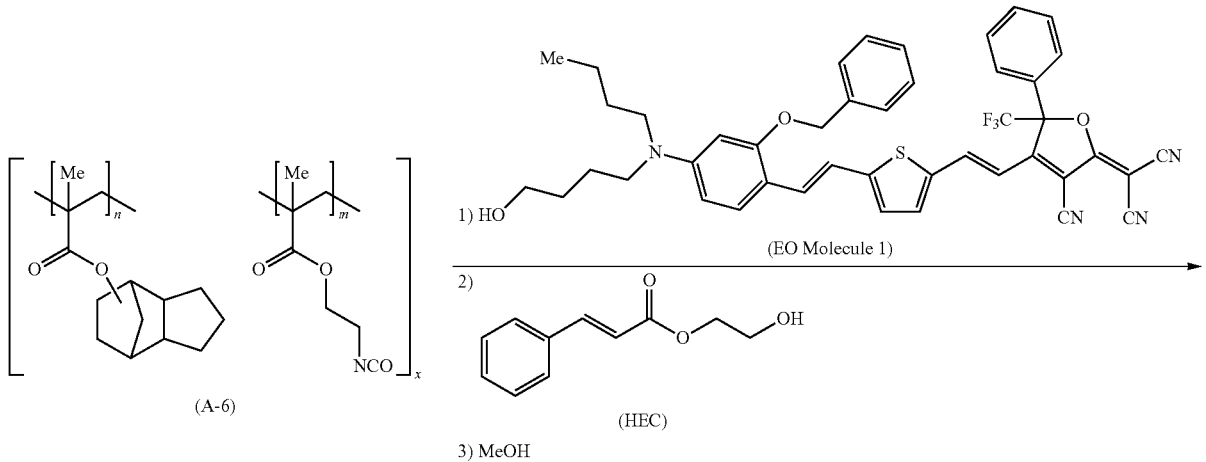

-continued

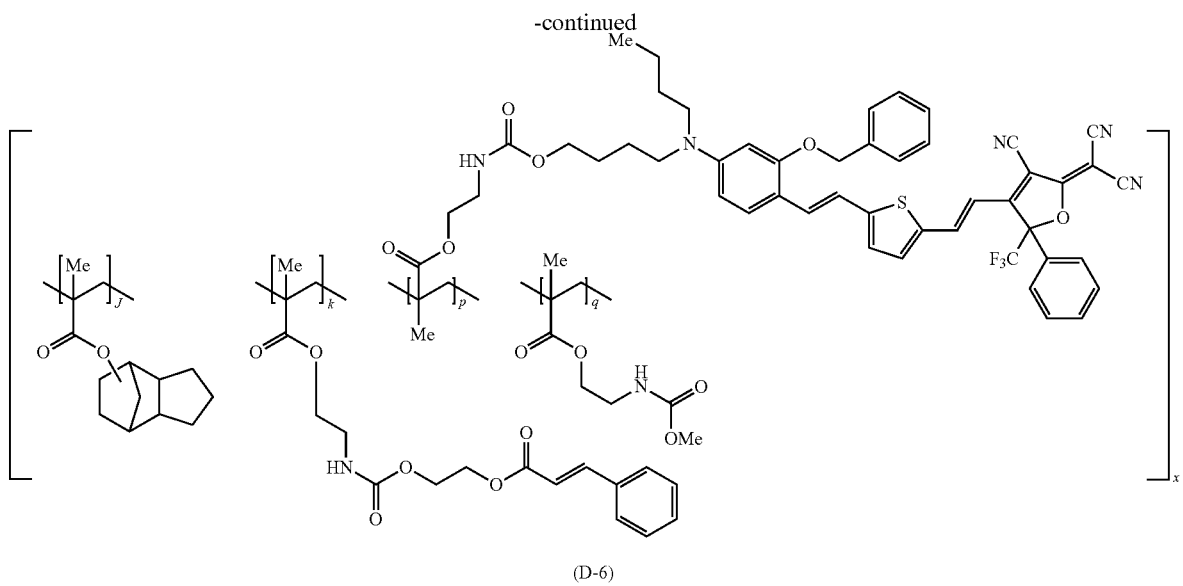

(D-6)

In 55 mL of tetrahydrofuran, 1.28 g (1.644 mmol) of Copolymer (A-6) was dissolved. To the solution, 0.6 g (0.789 mmol) of EO Molecule 1 and 40 μL of DBTDL were added. The container was filled with argon, and then the mixture was stirred in an oil bath at 60° C. for 2 hours. To this, 0.1 g (0.520 mmol) of HEC in 1 mL of tetrahydrofuran was added and then 20 μL of DBTDL was added thereto. The mixture was stirred for 1.5 hours, 3 mL of methanol was added thereto, and the whole was stirred for 40 minutes. The mixture was cooled and then poured into 550 mL of diisopropyl ether, and the whole was stirred. The black precipitated powder was collected by filtration using a glass filter, washed with diisopropyl ether and dried by heating to 70° C. under reduced pressure for 16 hours to give 1.73 g of Copolymer (D-6). The obtained Copolymer (D-6) had a Tg of 139.3° C.

Example 12

Copolymer (D-7)

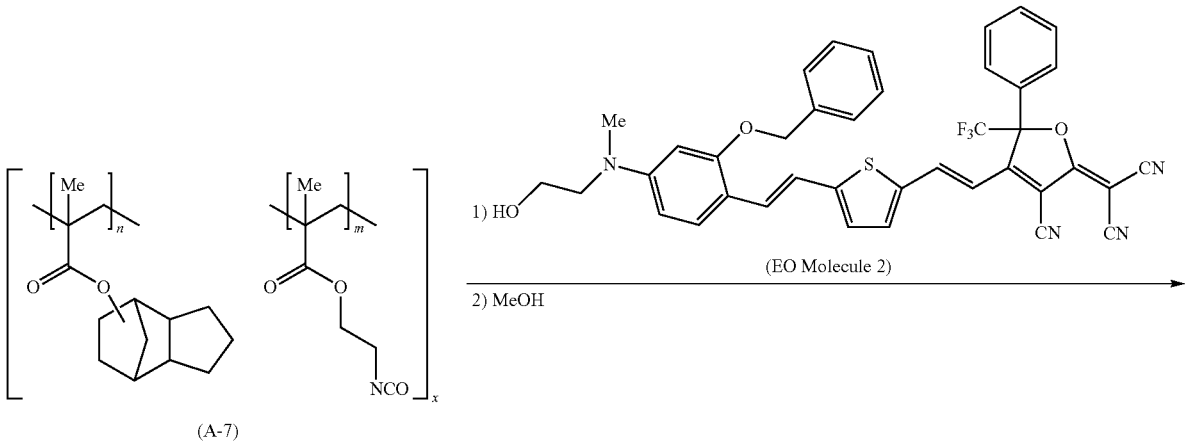

-continued

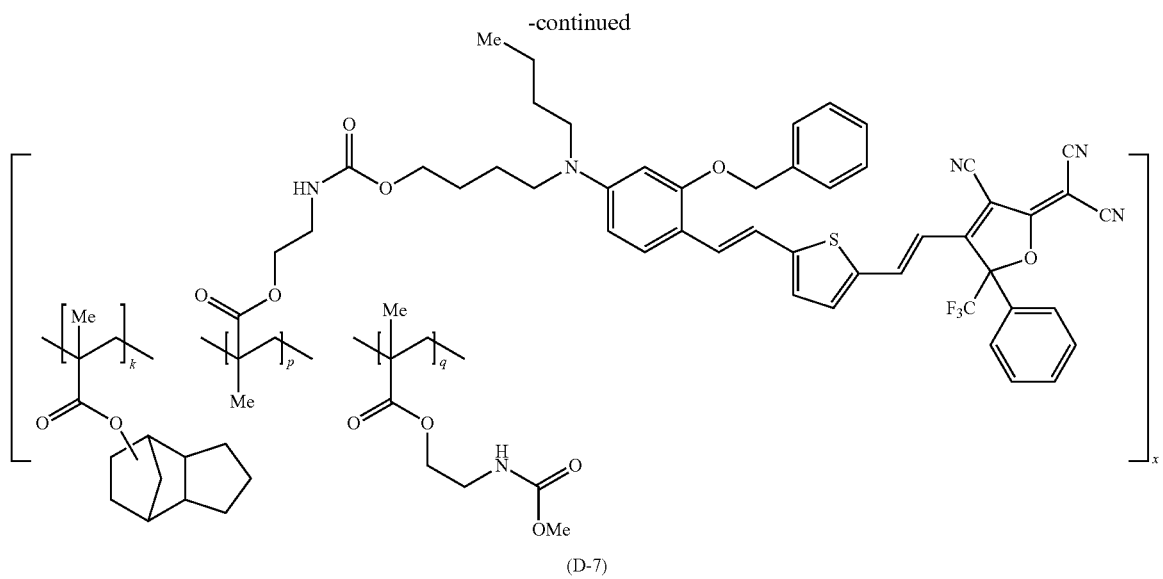

(D-7)

In 60 mL of tetrahydrofuran, 1.4 g (1.04 mmol) of Copolymer (A-7) was dissolved. To the solution, 0.61 g (0.883 mmol) of SKNEO-285 (EO Molecule 2) and 30 μL of DBTDL were added. The container was filled with argon, and then the mixture was stirred in an oil bath at 60° C. for 3.5 hours. To this, 1 mL of methanol and 10 μL of DBTDL were added and the whole was stirred for 40 minutes. The mixture was cooled and then poured into 450 mL of IPE, and the whole was stirred. The black precipitated powder was collected by filtration, washed with IPE and dried by heating to 70° C. under reduced pressure to give 1.69 g of Copolymer (D-7). The obtained Copolymer (D-7) had a Tg of 161.1° C.

Example 13

Copolymer (E-1)

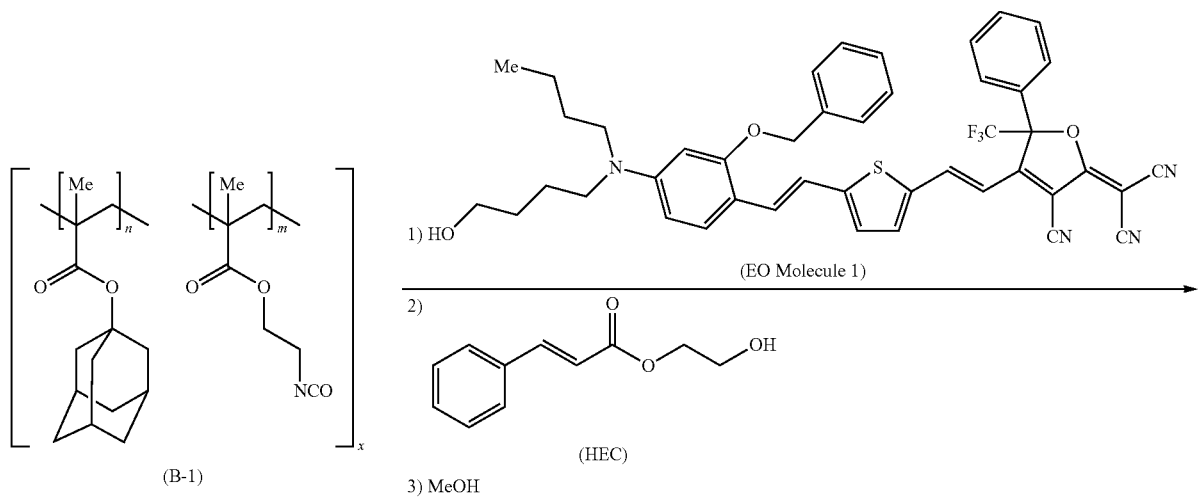

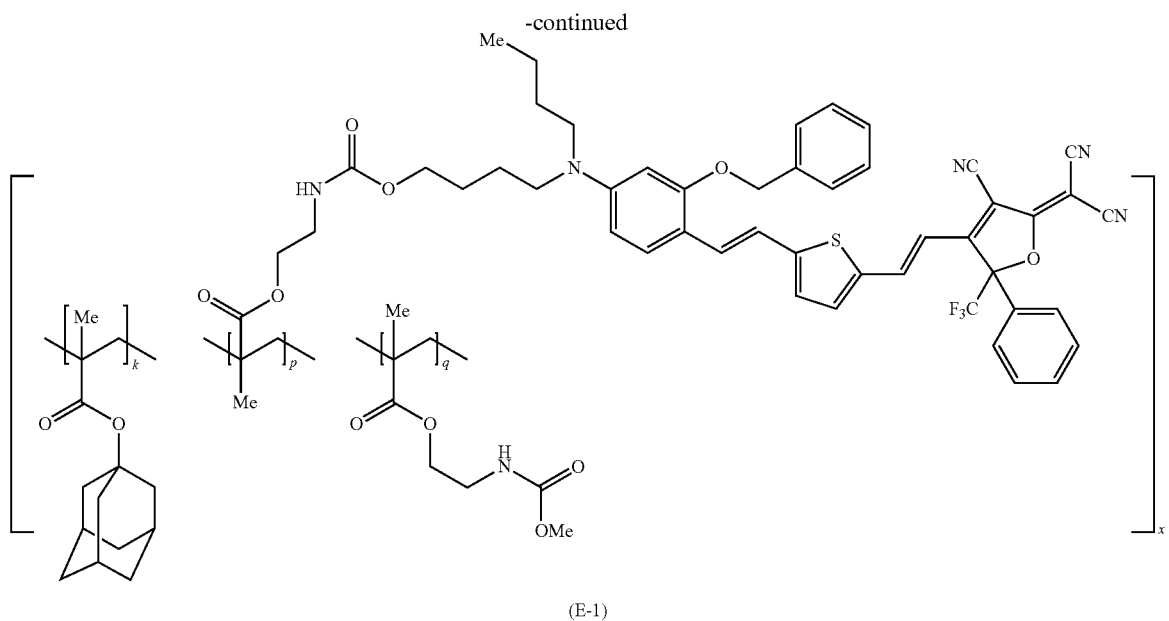

(E-1)

In 55 mL of tetrahydrofuran, 1.22 g of Copolymer (B-1) was dissolved. To the solution, 0.6 g (0.788 mmol) of EO Molecule 1 and 30 μL of DBTDL were added and the mixture was stirred in an oil bath at 60° C. for 2 hours. To this, 0.1 g (0.520 mmol) of HEC in 1 mL of tetrahydrofuran and 10 μL of DBTDL were added and the whole was stirred for 1.5 hours. To this, 3 mL of methanol was added and the whole was stirred for 1 hour. The reaction mixture was cooled and then poured into 550 mL of diisopropyl ether (IPE), and the whole was stirred. The precipitated powder was collected by filtration, washed with IPE, and then dried by heating to 70° C. under reduced pressure to give 1.54 g of Copolymer (E-1) as a black powder. The obtained Copolymer (E-1) had a Tg of 128.5° C.

Example 14

Copolymer (E-2)

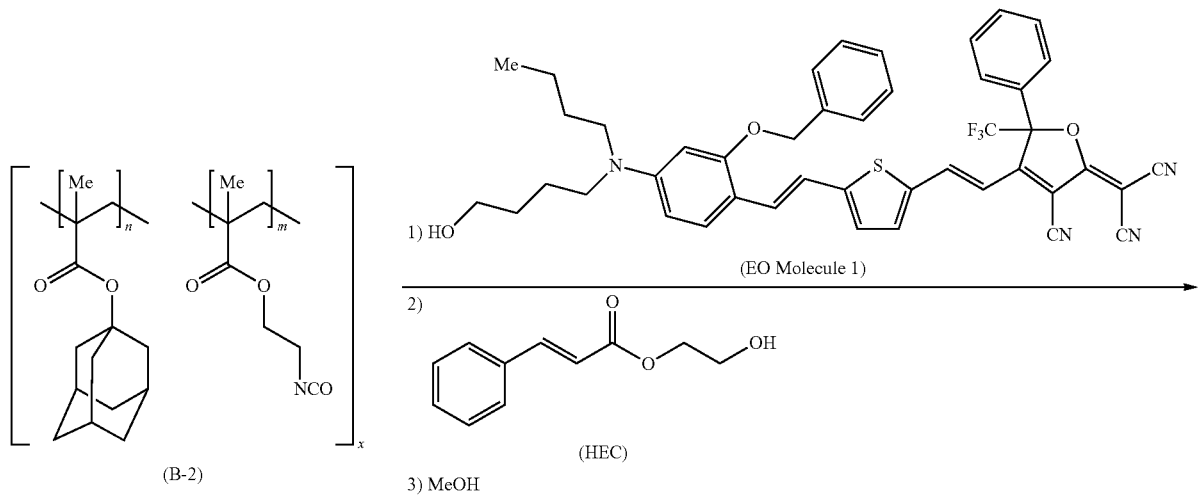

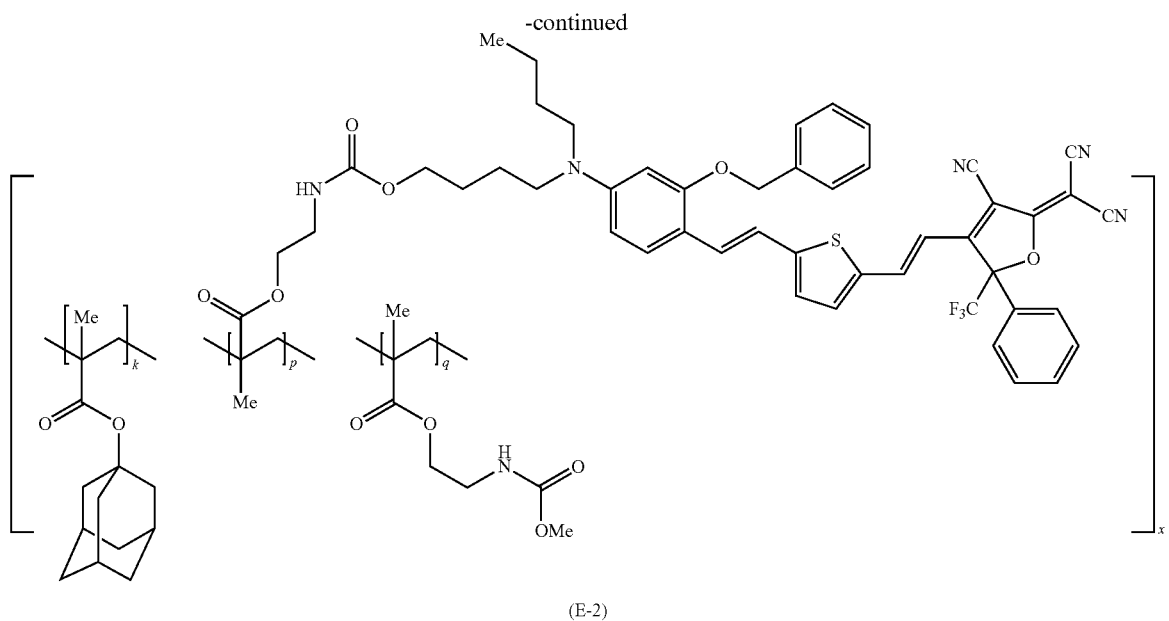

(E-2)

In 55 mL of tetrahydrofuran, 1.28 g of Copolymer (B-2) was dissolved. To the solution, 0.6 g (0.7875 mmol) of EO Molecule 1 and 40 μL of DBTDL were added and the mixture was stirred in an oil bath at 60° C. for 2 hours. To this, 0.1 g (0.5203 mmol) of HEC in 1 mL of tetrahydrofuran and 15 μL of DBTDL were added and the whole was stirred for 1.5 hours. To this, 3 mL of methanol was added and the whole was stirred for 1 hour. The reaction mixture was cooled and then poured into 700 mL of diisopropyl ether (IPE), and the whole was stirred. The precipitated powder was collected by filtration, washed with IPE, and then dried by heating to 70° C. under reduced pressure to give 1.67 g of Copolymer (E-2) as a black powder. The obtained Copolymer (E-2) had a Tg of 166.1° C.

Example 15

Copolymer (F-1)

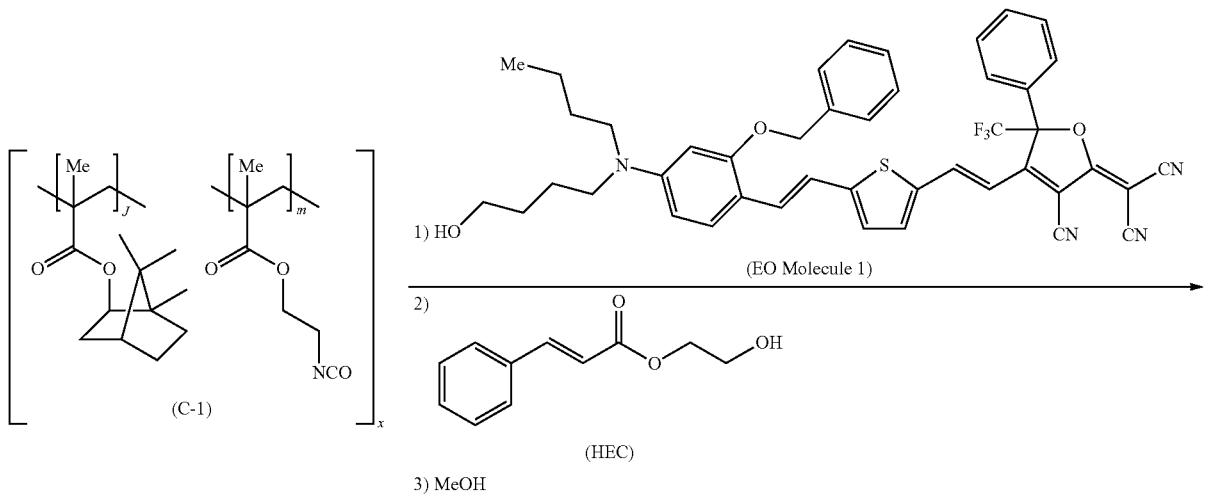

-continued

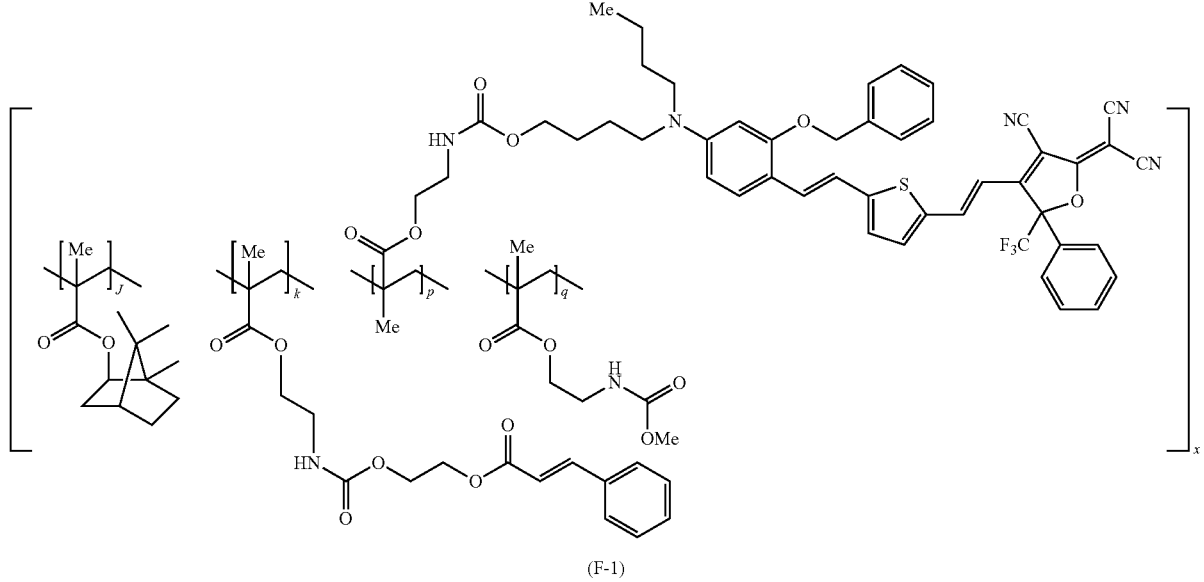

(F-1)

In 50 mL of tetrahydrofuran, 1.23 g of Copolymer (C-1) was dissolved. To the solution, 0.6 g (0.7885 mmol) of EO Molecule 1 and 40 μL of DBTDL were added and the mixture was stirred in an oil bath at 60° C. for 2 hours. To this, 0.1 g (0.5202 mmol) of HEC in 1 mL of tetrahydrofuran and 20 μL of DBTDL were added and the whole was stirred for 2 hours. To this, 3 mL of methanol was added and the whole was stirred for 30 minutes. The reaction mixture was cooled and then poured into 600 mL of diisopropyl ether (IPE), and the whole was stirred. The precipitated powder was collected by filtration, washed with IPE, and then dried by heating to 70° C. under reduced pressure to give 1.74 g of Copolymer (F-1) as a black powder. The obtained Copolymer (F-1) had a Tg of 122.1° C.

Example 16

Copolymer (F-2)

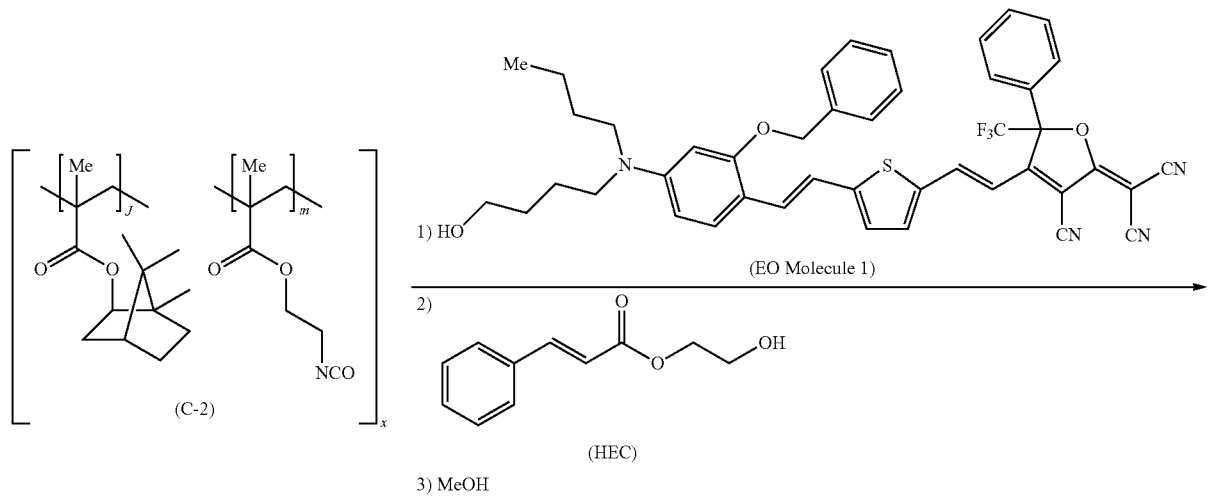

-continued

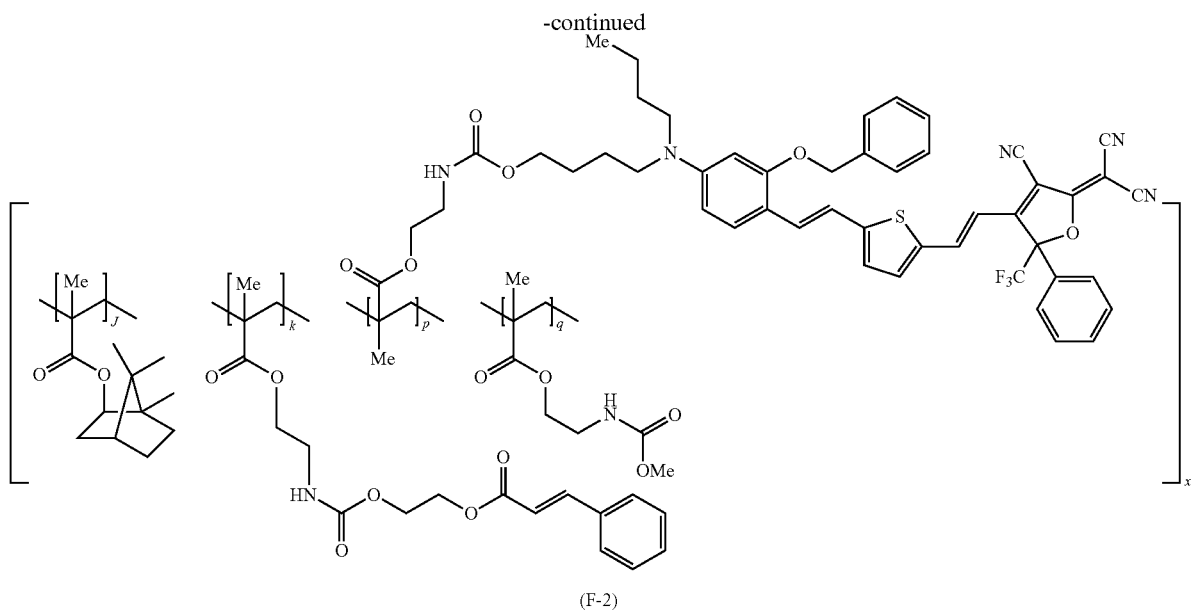

(F-2)

In 50 mL of tetrahydrofuran, 1.28 g of Copolymer (C-2) was dissolved. To the solution, 0.6 g (0.7885 mmol) of EO Molecule 1 and 40 μL of DBTDL were added and the mixture was stirred in an oil bath at 60° C. for 2 hours. To this, 0.1 g (0.5202 mmol) of HEC in 1 mL of THF and 20 μL of DBTDL were added and the whole was stirred for 1.5 hours. To this, 3 mL of methanol was added and the whole was stirred for 30 minutes. The reaction mixture was cooled and then poured into 600 mL of diisopropyl ether (IPE), and the whole was stirred. The precipitated powder was collected by filtration, washed with IPE, and then dried by heating to 70° C. under reduced pressure to give 1.73 g of Copolymer (F-2) as a black powder. The obtained Copolymer (F-2) had a Tg of 153.0° C.

The results of Examples 6 to 16 revealed that binding of an EO molecule to the copolymers comprising a cyclcoalkane methacrylate and 2-isocyanatoethyl methacrylate as monomers and having a desired Tg value (the copolymers obtained in Examples 1 to 5) resulted in organic EO polymers having a desired Tg.

Comparative Example 1

Copolymer (R-1)

In 13 mL of toluene were dissolved 6.97 g (69.62 mmol) of methyl methacrylate (MMA), 8.0 g (51.56 mmol) of 2-isocyanatoethyl methacrylate (MOI), and 0.6 g (3.65 mmol) of AIBN. The container was filled with argon, and then the mixture was stirred under shaded conditions in an oil bath at 60° C. for 2 hours. The mixture was cooled and then poured into 550 mL of IPE, and the whole was stirred. The precipitate was collected by filtration, washed with IPE and dried by heating to 70° C. under reduced pressure to give 12.24 g of Copolymer (R-1).

Copolymer (R-1) in an amount of 0.8 g was dissolved in 45 mL of tetrahydrofuran. To the solution, 3.0 mL of methanol and 30 μL of dibutyltin dilaurate (DBTDL) were added and the whole was stirred in an oil bath at 60° C. for 2 hours. The reaction mixture was cooled and then poured into 300 mL of IPE, and the whole was stirred. The precipitated powder was collected by filtration, washed with IPE, and then dried by heating to 70° C. under reduced pressure to give 0.79 g of a methylcarbamate of Copolymer (E-1) as a colorless powder. The obtained methylcarbamate had a Tg of 71.8° C.

Comparative Example 2

Copolymer (R-2)

In 29 mL of toluene were dissolved 14.19 g (141.74 mmol) of methyl methacrylate (MMA), 11.0 g (70.90 mmol) of 2-isocyanatoethyl methacrylate (MOI), and 1.04 g (6.33 mmol) of AIBN. The container was filled with argon, and then the mixture was stirred under shaded conditions in an oil bath at 60° C. for 2 hours. The mixture was cooled and then poured into 900 mL of IPE, and the whole was stirred. The precipitate was collected by filtration, washed with IPE and dried by heating to 70° C. under reduced pressure to give 20.84 g of Copolymer (R-2).

Copolymer (R-2) in an amount of 0.02 g was dissolved in 50 mL of tetrahydrofuran. To the solution, 1.0 mL of methanol and 30 μL of dibutyltin dilaurate (DBTDL) were added and the whole was stirred in an oil bath at 60° C. for 2 hours. The reaction mixture was cooled and then poured into 300 mL of IPE, and the whole was stirred. The precipitated powder was collected by filtration, washed with IPE, and then dried by heating to 70° C. under reduced pressure to give 0.84 g of a methylcarbamate of Copolymer (R-2) as a colorless powder. The obtained methylcarbamate had a Tg of 86.4° C.

The results of Comparative Examples 1 and 2 revealed that, in the case of the production of a copolymer comprising methyl methacrylate and 2-isocyanatoethyl methacrylate as monomers, adjusting the blending ratio of methyl methacrylate to 2-isocyanatoethyl methacrylate resulted in a copolymer having a low Tg, and failed to provide a copolymer with a desired Tg, in contrast to the copolymers obtained in Examples comprising a cycloalkane methacrylate and 2-isocyanatoethyl methacrylate as monomers and having a desired Tg.

INDUSTRIAL APPLICABILITY

According to the present invention, an organic EO polymer having a desired Tg can be produced, and the polymer can be used as an organic EO polymer to serve as core and cladding layers having a Tg optimized for use as an EO material. Since the present invention provides such an organic EO polymer that serves as core and cladding layers having a Tg optimized for use as an EO material, the present invention enables the production of an organic EO polymer device with a high EO effect, thereby allowing the production of a small-sized optical modulator with a high EO efficiency and enabling optical communication at high speed and low power consumption.

The invention claimed is:

1. A copolymer comprising:
   (i) a cycloalkyl methacrylate having a fused ring and a 2-isocyanatoethyl methacrylate as monomers,
   wherein the cycloalkyl methacrylate having a fused ring is at least one selected from the group consisting of dicyclopentanyl methacrylate, adamantyl methacrylate, and isobornyl methacrylate,
   wherein a molar ratio of the cycloalkyl methacrylate to the 2-isocyanatoethyl methacrylate is 1.87:1 to 6:1, with the proviso that when the monomers are octahydro 1H-4,7-methano indenyl methacrylate (DCPMA) and 2-isocyanatoethyl methacrylate, a molar ratio of the DCPMA to the 2-isocyanatoethyl methacrylate of 3:2 is excluded; and
   (ii) an electro-optic molecule (EO molecule) bound to the copolymer, wherein the EO molecule is a component having second order nonlinear optical properties, and wherein an amount of the EO molecule relative to a total amount of the copolymer with the EO molecule is 10 to 50% by weight,
   wherein a glass transition temperature (Tg) of the copolymer is 120° C. to 230° C.

2. The copolymer according to claim 1, wherein the cycloalkyl methacrylate has a bridged fused ring.

3. An organic electro-optic element comprising the copolymer according to claim 1.

4. An organic electro-optic element comprising the copolymer according to claim 2.

5. The organic electro-optic element according to claim 3, which is an optical modulator or an optical switch.

6. The organic electro-optic element according to claim 4, which is an optical modulator or an optical switch.

7. A method for producing a copolymer having a glass transition temperature (Tg) of 120° C. to 230° C., the method comprising:
   (i) preparing a copolymer comprising a cycloalkyl methacrylate having a fused ring and a 2-isocyanatoethyl methacrylate as monomers,
   wherein the cycloalkyl methacrylate having a fused ring is at least one selected from the group consisting of dicyclopentanyl methacrylate, adamantyl methacrylate, and isobornyl methacrylate, and
   wherein a molar ratio of the cycloalkyl methacrylate to the 2-isocyanatoethyl methacrylate is 1.87:1 to 6:1, with the proviso that when the monomers are octahydro 1H-4,7-methano indenyl methacrylate (DCPMA) and 2-isocyanatoethyl methacrylate, a molar ratio of the DCPMA to the 2-isocyanatoethyl methacrylate of 3:2 is excluded; and
   (ii) binding an electro-optic molecule (EO molecule) to the copolymer, wherein the EO molecule is a component having second order nonlinear optical properties, and wherein an amount of the EO molecule relative to a total amount of the copolymer with the EO molecule is 10 to 50% by weight.

* * * * *